(12) United States Patent
Peng (10) Patent No.: US 11,353,126 B1
(45) Date of Patent: Jun. 7, 2022

(54) VALVE CORE WITH A FLOW-THROUGH ROD

(71) Applicant: Kuching International Ltd., Taichung (TW)

(72) Inventor: Hao-Nan Peng, Taichung (TW)

(*) Notice: Subject to any disclaimer, the term of this patent is extended or adjusted under 35 U.S.C. 154(b) by 0 days.

(21) Appl. No.: 17/357,325

(22) Filed: Jun. 24, 2021

(51) Int. Cl.
| F16K 11/00 | (2006.01) |
| F16K 31/365 | (2006.01) |
| F16K 15/14 | (2006.01) |
| F16K 31/06 | (2006.01) |
| F16K 11/078 | (2006.01) |
| F16K 11/072 | (2006.01) |
| F16K 31/126 | (2006.01) |
| F16K 31/128 | (2006.01) |
| F16K 11/06 | (2006.01) |

(52) U.S. Cl.
CPC ........ F16K 15/1441 (2021.08); F16K 19/006 (2013.01); F16K 31/0672 (2013.01); F16K 11/06 (2013.01); F16K 11/072 (2013.01); F16K 11/0787 (2013.01); F16K 31/0617 (2013.01); F16K 31/126 (2013.01); F16K 31/128 (2013.01); F16K 31/365 (2013.01)

(58) Field of Classification Search
CPC .. F16K 11/0787; F16K 19/006; F16K 31/128; F16K 31/126; F16K 31/0617; F16K 11/072; F16K 11/06; F16K 31/0672; F16K 15/1441; F16K 31/365
See application file for complete search history.

(56) References Cited

U.S. PATENT DOCUMENTS

| 5,280,803 | A | * | 1/1994 | Swift | ............. F16K 47/02 251/126 |
| 10,167,963 | B1 | * | 1/2019 | Chang | ............. F16K 27/045 |
| 2001/0020490 | A1 | * | 9/2001 | Lorenzelli | ......... G05D 23/1393 137/624.11 |
| 2013/0341541 | A1 | * | 12/2013 | Boticki | ............. F16K 31/46 251/65 |
| 2014/0261743 | A1 | * | 9/2014 | Schreier | ............. F16K 31/408 137/15.18 |
| 2017/0314701 | A1 | * | 11/2017 | Vulkan | ............. F16K 7/12 |

* cited by examiner

*Primary Examiner* — Umashankar Venkatesan
(74) *Attorney, Agent, or Firm* — Egbert, McDaniel & Swartz, PLLC (57) ABSTRACT

A valve core with a flow-through rod, has a valve seat, a valve shell, a certain valve plate, a movable valve plate, a valve plate, a connecting piece, a flow penetrating rod, a blocking piece and a detent structure, wherein the detent structure is used for stopping reciprocating actuation of the blocking piece, so that the water pressure forms a difference change; and the valve piece is elastically driven to change whether water flows out outwards, and the connecting piece is connected with the movable valve piece, so that the movable valve piece can be locked to rotate, and the water flowing out of the outside can be adjusted and controlled.

4 Claims, 7 Drawing Sheets

VALVE CORE WITH A FLOW-THROUGH ROD

CROSS-REFERENCE TO RELATED U.S. APPLICATIONS

Not applicable.

BACKGROUND OF THE INVENTION

1. Field of the Invention

The present invention relates generally to a piping installation for controlling fluid, and more particularly to an innovative structure type of a valve core with a flow-through rod.

2. Description of Related Art Including Information Disclosed Under 37 CFR 1.97 and 37 CFR 1.98

The known electromagnetic induction valve core for controlling fluid comprises a valve shell, a blocking plate and an electromagnetic control structure. The blocking plate is disposed in the valve shell, an inlet channel and an outlet channel are formed inside the valve shell, and the inlet channel communicates with an external water source. The blocking plate blocks off the connected relation between the inlet channel and the outlet channel. The electromagnetic control device is connected to the blocking plate, so as to control the reciprocating actuation of the blocking plate, and to change the connected relation between the inlet channel and the outlet channel, controlling the water to or not to flow out through the outlet channel. The electromagnetic control structure is coupled with a sensor, and the sensor transmits an electronic signal to the electromagnetic control structure based on induction. The electromagnetic control structure controls the actuation of the blocking plate based on the electronic signal, so as to automatically control the water to or not to flow through the valve core.

The known valve core still has the following problems and defects according to practical experience: the electromagnetic control structure controls the actuation of the blocking plate, automatically controlling the water to or not to flow through the valve core, but it cannot regulate the water output through the valve core according to the water demand.

BRIEF SUMMARY OF THE INVENTION

The primary objective of the present invention is to provide a valve core with a flow-through rod, the technical problem to be solved is to break through how to develop a novel valve core with more ideal practicability.

Based on the said objective, the technical characteristic of problem solving of the present invention is that the valve core with a flow-through rod comprises a valve seat, a valve shell, a fixed valve plate, a movable valve plate, a valve plate, a connecting piece, a flow-through rod, a blocking piece and a detent structure, wherein the fixed valve plate and the movable valve plate are imperviously superposed and disposed in the valve seat, the fixed valve plate penetrates an inlet channel and an outlet channel, the movable valve plate forms a division tube and a first chamber, the division tube communicates with the outlet channel, the first chamber is formed outside the division tube, one end of the division tube far from the fixed valve plate forms an end, the movable valve plate penetrates a first channel, the first channel communicates with the first chamber and the inlet channel, so that the water flows into the first chamber through the inlet channel and the first channel, and flows out of the valve seat through the division tube and the outlet channel.

The valve plate is made of elastic material. The valve plate is disposed in the valve seat, and the valve piece is located on one side of the movable valve plate far from the fixed valve plate. The valve plate is axially opposite to the division tube, so that the valve plate abuts on or departs from the end, so as to change the connected relation between the division tube and the first chamber. The valve plate penetrates a second channel.

One end of the connecting piece is axially pivoted on the valve seat, and the other end of the connecting piece is connected to the valve shell. The connecting piece is connected to the movable valve plate inside the valve seat, so that the connecting piece stops the rotation of the movable valve plate against the fixed valve plate. A second chamber is formed inside the connecting piece, and the second chamber communicates with the first chamber through the second channel. A third channel is extended from the second chamber, and the third channel extends in the axial direction of the connecting piece to the valve shell. The connecting piece is provided with a supporting plate, and the supporting plate is formed on one end of the third channel far from the movable valve plate. The supporting plate penetrates a through hole, and the through hole communicates with the third channel.

The flow-through rod is axially disposed in the connecting piece, and the flow-through rod axially contacts the supporting plate and the valve plate, so as to locate the flow-through rod, and the valve plate performs reciprocating elastic actuation in the axial direction of the flow-through rod. The third channel is located on the lateral face of the flow-through rod. The flow-through rod axially penetrates a fourth channel. The fourth channel communicates with the division tube.

The blocking piece and the detent structure are disposed in the valve shell respectively. The flow-through rod and the third channel are axially opposite to the blocking piece respectively. The detent structure is connected to the blocking piece, so as to stop the axial reciprocating actuation of the blocking piece, and to change the connected relation between the third channel and the fourth channel.

In terms of the main effect and advantage of the present invention, when the detent structure stops the actuation of the blocking plate, the water pressure is changed, controlling the water to or not to flow out, and the connecting piece stops the rotation of the movable valve plate to control the water output.

DETAILED DESCRIPTION OF THE INVENTION

FIG. 1 to FIG. 7 show the preferred embodiments of the valve core with a flow-through rod of the present invention, but the embodiments are for illustration only, the patent application is not limited to this structure.

The preferred embodiment includes a valve seat 10, a valve shell 20, a fixed valve plate 30, a movable valve plate 40, a valve plate 50, a connecting piece 60, a flow-through rod 70, a blocking piece 80 and a detent structure 90, wherein the fixed valve plate 30 and the movable valve plate 40 are imperviously superposed and disposed in the valve seat 10. The fixed valve plate 30 penetrates two inlet channels 32 and an outlet channel 34. The movable valve plate 40 forms a division tube 42 and a first chamber 44. The division tube 42 communicates with the outlet channel 34. The first chamber 44 is formed outside the division tube 42. In this case, the first chamber 44 surrounds the division tube 42, and one end of the division tube 42 far from the fixed valve plate 30 forms an end 46. The movable valve plate 40 penetrates a first channel 48, and the first channel 48 communicates with the first chamber 44 and at least one of the inlet channels 32, so that the water flows into the first chamber 44 through the inlet channel 32 and the first channel 48, and departs from the valve seat 10 through the division tube 42 and the outlet channel 34. The number of the inlet channels 32 can be changed as required, but there shall be at least one inlet channel 32, when there is one inlet channel 32, the flow entering the first chamber 44 through the inlet channel 32 can be changed by rotating the movable valve plate 40. When there are multiple inlet channels 32, the inlet channels 32 can communicate with different external water sources respectively (not shown in the figure). The proportions of the water in the first chamber 44 from different water sources are changed by rotating the movable valve plate 40. The number of the inlet channels 32 can be easily thought of by the persons of the said domain in the present invention based on the preferred embodiment.

The valve plate 50 is made of elastic material, the valve plate 50 is disposed in the valve seat 10, and the valve plate 50 is located on one side of the movable valve plate 40 far from the fixed valve plate 30. The valve plate 50 is axially opposite to the division tube 42, so that the valve plate 50 abuts on or departs from the end 46, so as to change the connected relation between the division tube 42 and the first chamber 44, the valve plate 50 penetrates a second channel 52.

One end of the connecting piece 60 is axially pivoted on the valve seat 10, and the other end of the connecting piece 60 is connected to the valve shell 20, so that the connecting piece 60 rotates against the valve seat 10. The connecting piece 60 is connected to the movable valve plate 40 inside the valve seat 10, so that the connecting piece 60 stops the rotation of the movable valve plate 40 against the fixed valve plate 30. A second chamber 61 is formed in the connecting piece 60. The first chamber 44 and the second chamber 61 are located at both ends in axial direction of the valve plate 50, and the second chamber 61 provides a space for reciprocating elastic actuation of the valve plate 50 getting close to or away from the fixed valve plate 30. The second chamber 61 communicates with the first chamber 44 through the second channel 52. A third channel 62 extends from the second chamber 61. The third channel 62 extends in the axial direction of the connecting piece 60 to the valve shell 20. The connecting piece 60 is provided with a supporting plate 63. The supporting plate 63 is formed on one end of the third channel 62 far from the movable valve plate 40. The supporting plate 63 penetrates several through holes 64. The through holes 64 communicate with the third channel 62 respectively. The number of the through holes 64 can be changed as required, but there shall be at least one through hole 64.

The flow-through rod 70 is axially disposed in the connecting piece 60. The flow-through rod 70 axially contacts the supporting plate 63 and the valve plate 50, so as to locate the flow-through rod 70, and the valve plate 50 performs reciprocating elastic actuation getting close to or away from the fixed valve plate 30 in the axial direction of the flow-through rod 70. The third channel 62 is located on lateral face of the flow-through rod 70, and the third channel 62 is annularly formed on the lateral face of the flow-through rod 70, and the through holes 64 are annularly disposed taking the axial direction of the flow-through rod 70 as center. The flow-through rod 70 axially penetrates a fourth channel 72. The fourth channel 72 communicates with the division tube 42. In this case, one end of the flow-through rod 70 extends into the division tube 42, so as to enhance the reliability of the connection between the fourth channel 72 and the division tube 42.

The blocking piece 80 and the detent structure 90 are disposed in the valve shell 20 respectively, the flow-through rod 70 and the third channel 62 are axially opposite to the blocking piece 80 respectively, the detent structure 90 is connected to the blocking piece 80, so that the detent structure 90 stops the axial reciprocating actuation of the blocking piece 80, so as to change the connected relation between the third channel 62 and the fourth channel 72. The blocking piece 80 is opposite to the detent structure 90, which can be thought of by the persons of the domain of the present invention, the specific construction will not be detailed.

Figure 5:
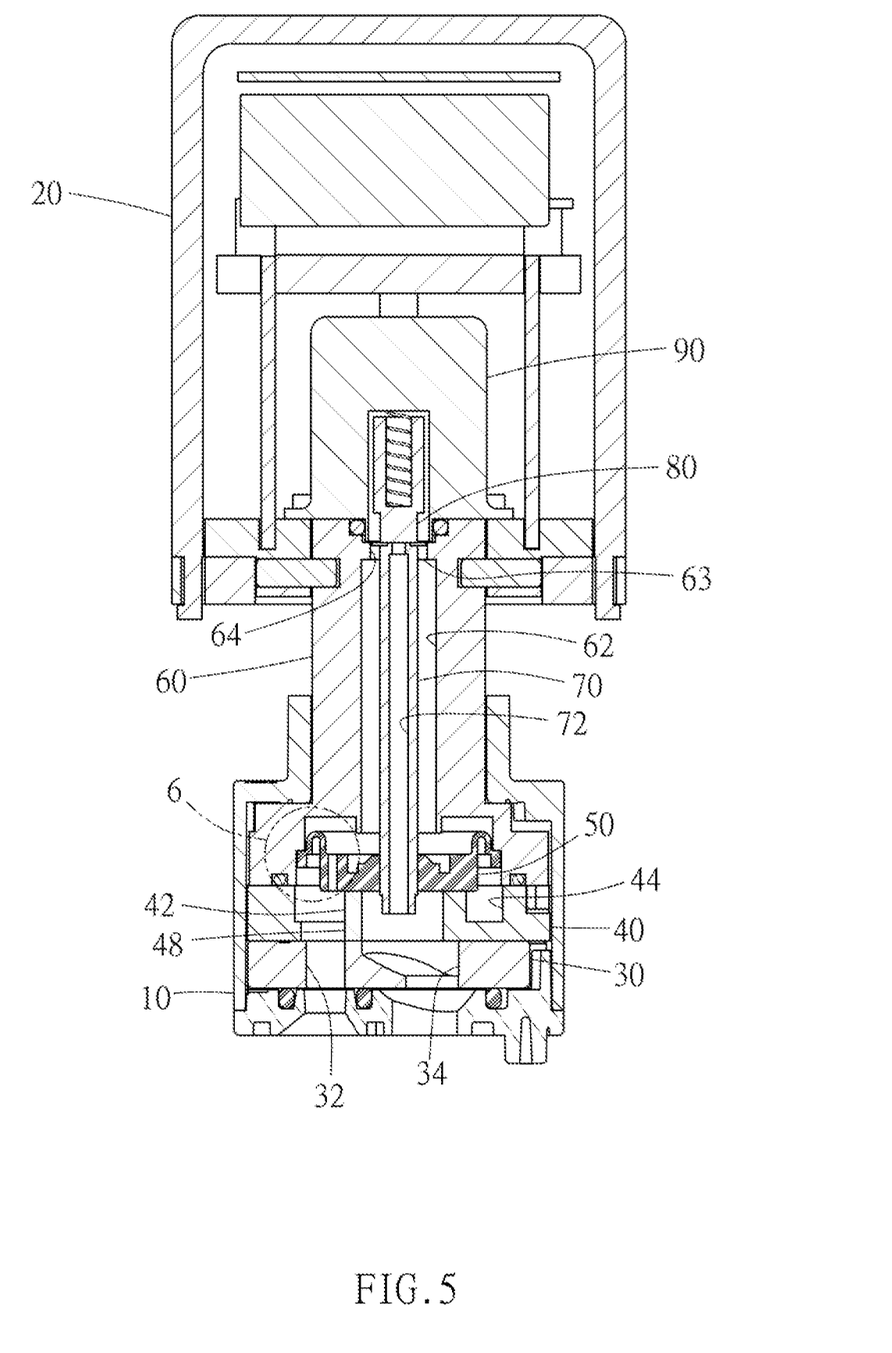
FIG. 5 is an axial section view of the preferred embodiment of the present invention, showing the closed state.
Figure 6:
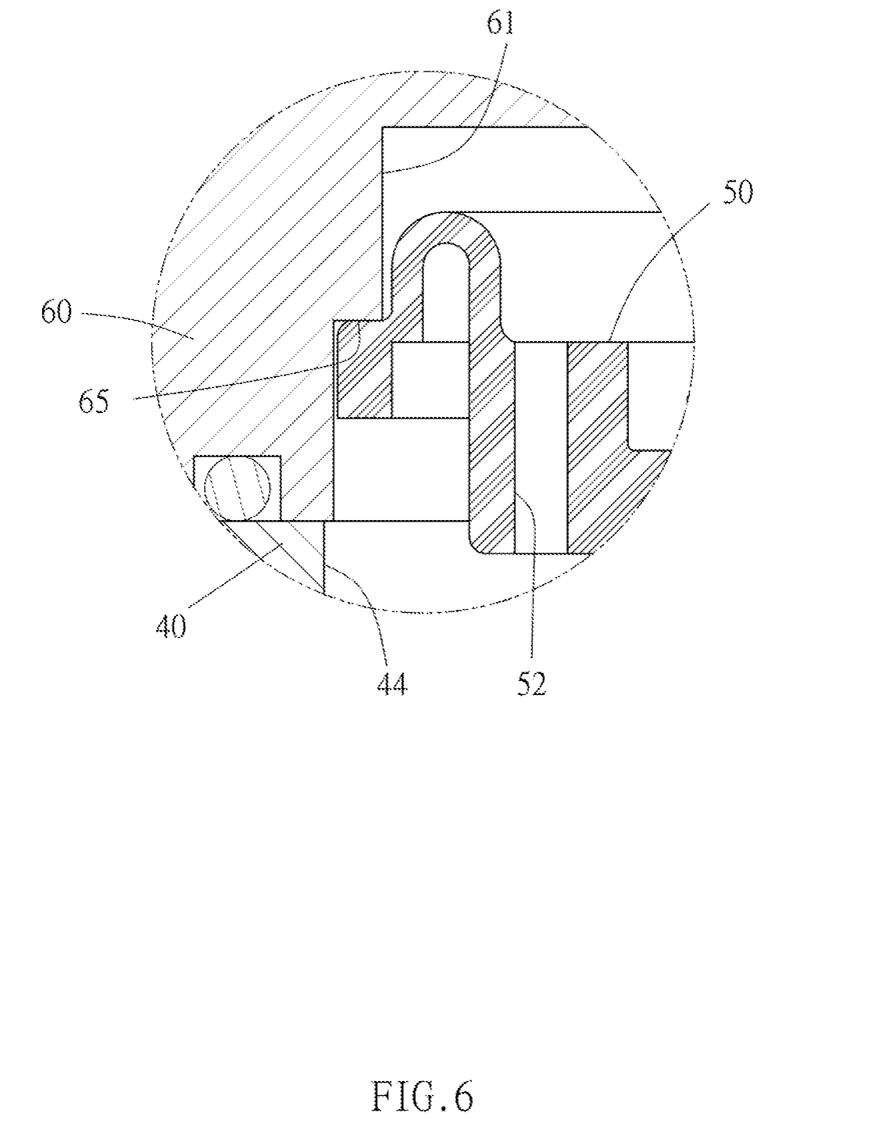
FIG. 6 is a drawing of partial enlargement of FIG. 5.

Based on the said structural composition type and technical characteristic, as shown in FIG. 5, when the blocking piece 80 abuts on one end of the flow-through rod 70 far from the division tube 42, the blocking piece 80 closes one end of the fourth channel 72 far from the division tube 42, and the third channel 62 cannot communicate with the fourth channel 72 through the through holes 64. At this point, the water from external water source (not shown in the figure) enters the first chamber 44, the second chamber 61 and the third channel 62 through the inlet channel 32, and the valve plate 50 abuts on the end 46, the water cannot enter the fourth channel 72, the division tube 42 and the outlet channel 34, the water is in stationary state in the inlet channel 32, the first chamber 44, the second chamber 61 and the third channel 62. The water pressure inside the third channel 62 is defined as the first water pressure, the water pressure inside the first chamber 44 is the second water pressure, and the first water pressure is identical with the second water pressure.

Figure 7:
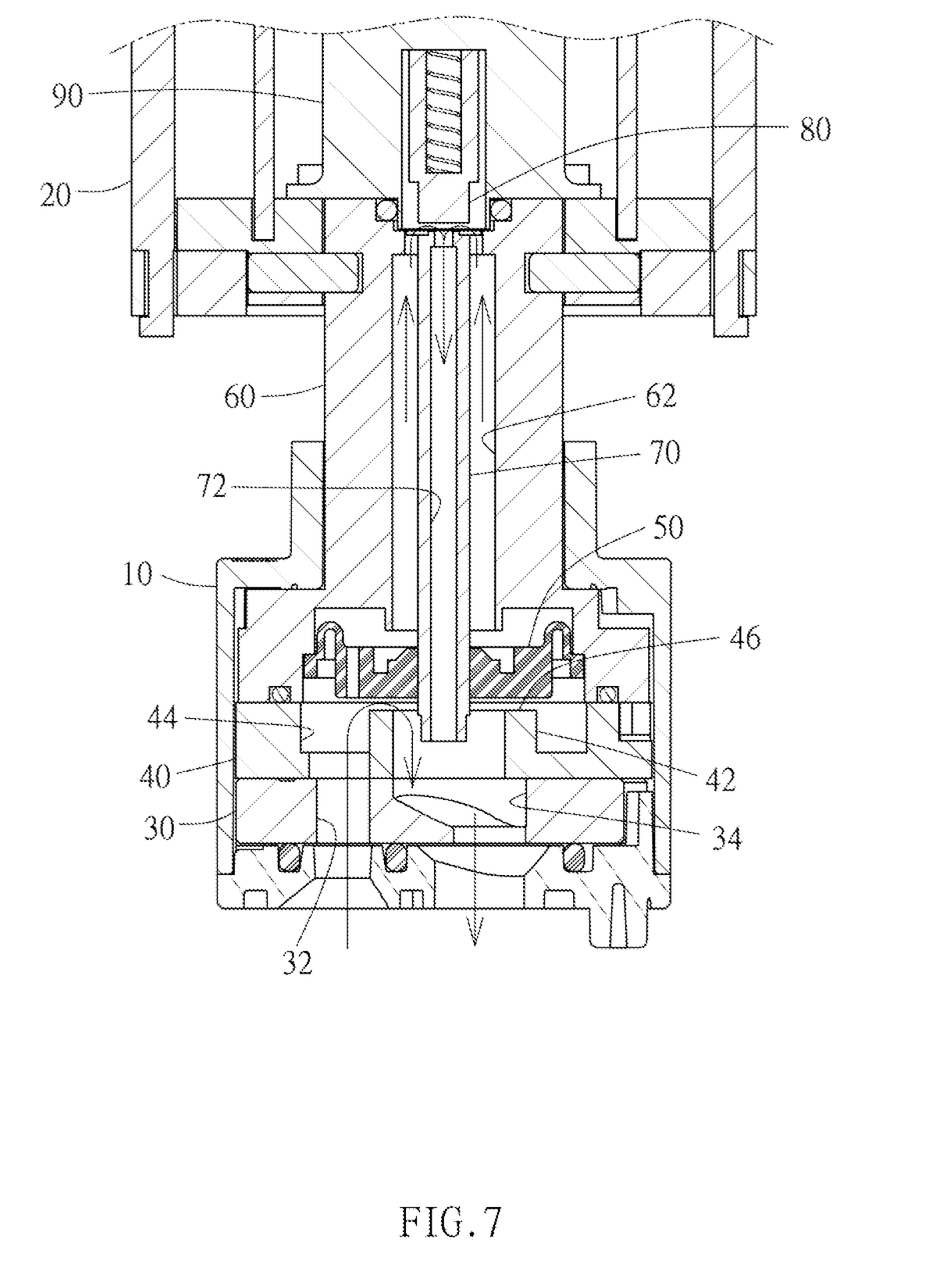
FIG. 7 is an axial section view of the preferred embodiment of the present invention, showing the opening state.

As shown in FIG. 7, when the detent structure 90 stops the actuation of the blocking piece 80 getting away from the flow-through rod 70, the sealing effect of the blocking piece 80 on one end of the fourth channel 72 far from the division tube 42 is cancelled. The water can flow into the fourth channel 72 from the third channel 62 through the through holes 64, and into the division tube 42 and the outlet channel 34, so that the first water pressure drops, in the early stage of actuation of the blocking piece 80 getting away from the flow-through rod 70, the second water pressure is higher than the first water pressure, so that the portion of the valve plate 50 near the periphery of the flow-through rod 70 is elastically actuated away from the end 46, the water can flow into the division tube 42 from the first chamber 44 through the valve plate 50 and the end 46, and then flows out through the outlet channel 34.

When the preferred embodiment is in the state shown in FIG. 7, the detent structure 90 stops the actuation of the blocking piece 80 and abuts on the flow-through rod 70, the first water pressure rises, the first water pressure and the elastic-restoring force of the valve plate 50 make the valve plate 50 abut on the end 46, and the preferred embodiment is restored to the state shown in FIG. 5.

When the detent structure 90 stops the actuation of the blocking plate 80, the first water pressure and the second water pressure form a pressure difference, controlling the water in the preferred embodiment to or not to flow out, and the connecting piece 60 stops the rotation of the movable valve plate 40, controlling the water output through the preferred embodiment, and the proportions of the water in the preferred embodiment from different water sources can be regulated. The detent structure 90 is an electromagnetic control structure, so as to automatically control the actuation of the blocking piece 80.

The connecting piece 60 is provided with a ring surface 65, the ring surface 65 is located in the second chamber 61, the valve plate 50 abuts on the ring surface 65, so as to locate the valve plate 50.

Figure 1:
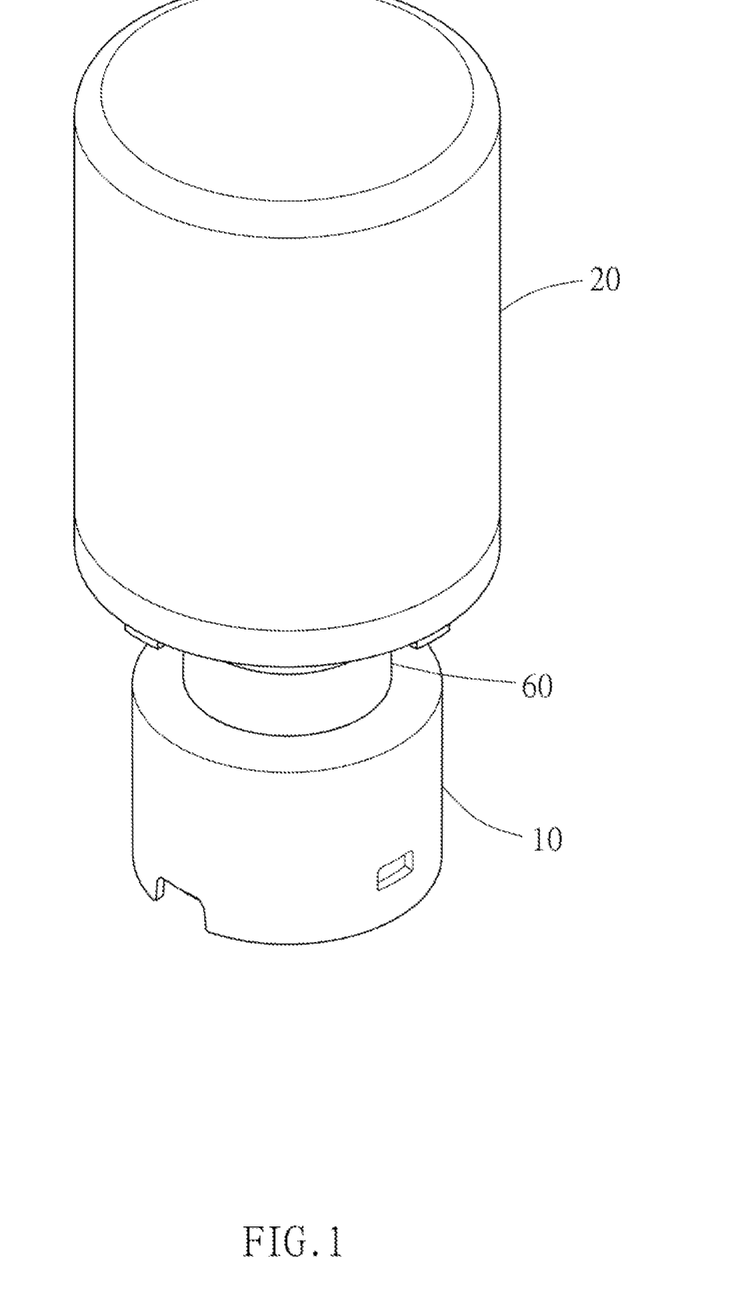
FIG. 1 is a stereogram of the preferred embodiment of the present invention.
Figure 2:
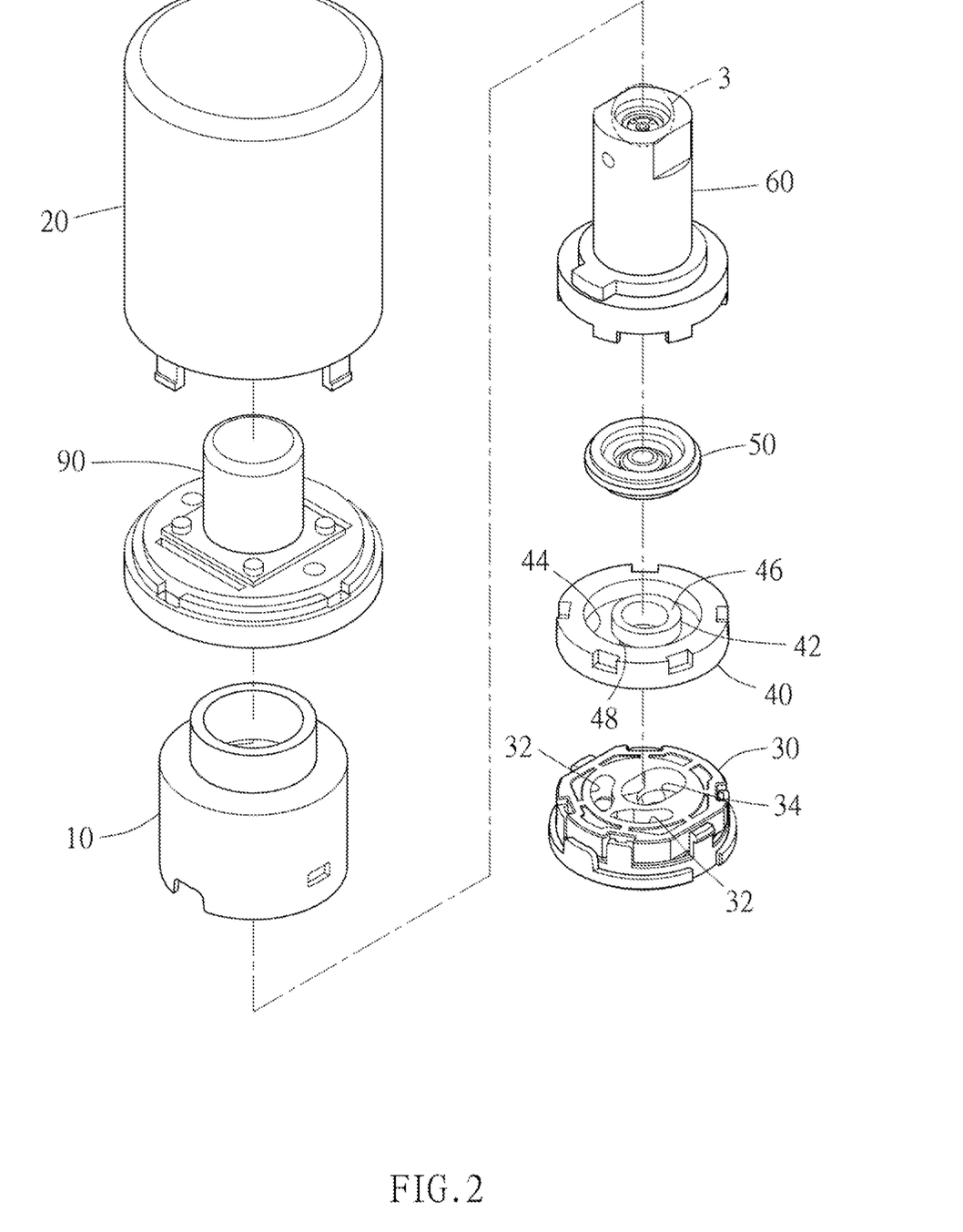
FIG. 2 is a three-dimensional exploded view of the preferred embodiment of the present invention.
Figure 3:
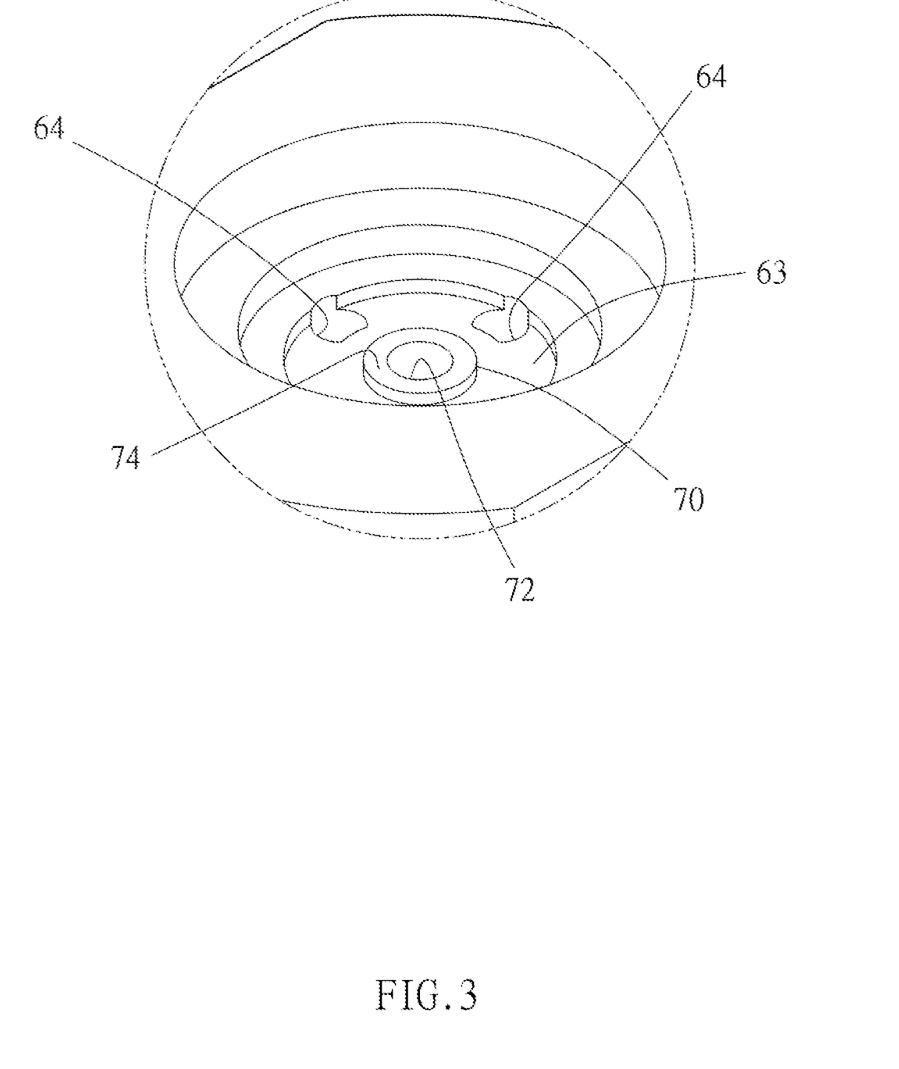
FIG. 3 is a drawing of partial enlargement of FIG. 2.
Figure 4:
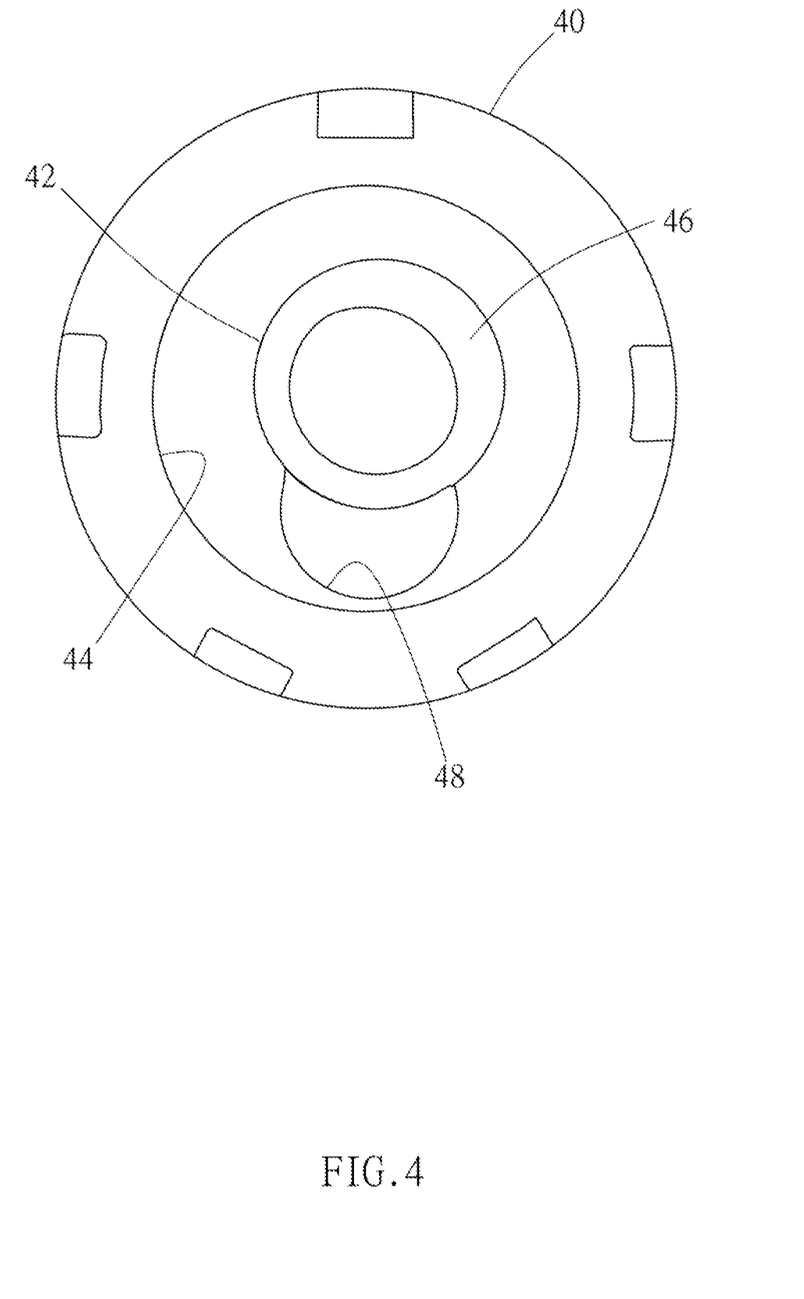
FIG. 4 is a top view of the movable valve plate in the preferred embodiment of the present invention.

As shown in FIG. 3, one end of the flow-through rod 70 far from the valve plate 50 forms an end face 74, so that the blocking piece 80 abuts on the end face 74, so as to block off the connected relation between the third channel 62 and the fourth channel 72.

I claim:

1. A valve core with a flow-through rod comprises a valve seat, a valve shell, a fixed valve plate, a movable valve plate, a valve plate, a connecting piece, a blocking piece and a detent structure, wherein the fixed valve plate and the movable valve plate are imperviously superposed and disposed in the valve seat, the fixed valve plate penetrates an inlet channel and an outlet channel, the movable valve plate forms a division tube and a first chamber, the division tube communicates with the outlet channel, the first chamber is formed outside the division tube, one end of the division tube far from the fixed valve plate forms an end, the movable valve plate penetrates a first channel, the first channel communicates with the first chamber and the inlet channel, so that the water flows into the first chamber through the inlet channel and the first channel, and flows out of the valve seat through the division tube and the outlet channel;

the valve plate is made of elastic material, the valve plate is disposed in the valve seat, and the valve plate is located on one side of the movable valve plate far from the fixed valve plate, the valve plate is axially opposite to the division tube, so that the valve plate abuts on or departs from the end, so as to change the connected relation between the division tube and the first chamber, the valve plate penetrates a second channel;

one end of the connecting piece is axially pivoted on the valve seat, the other end of the connecting piece is connected to the valve shell, the connecting piece is connected to the movable valve plate in the valve seat, so that the connecting piece stops the rotation of the movable valve plate against the fixed valve plate, a second chamber is formed inside the connecting piece, the second chamber communicates with the first chamber through the second channel, a third channel extends from the second chamber, the third channel extends in the axial direction of the connecting piece to the valve shell, the connecting piece is provided with a supporting plate, the supporting plate is formed on one end of the third channel far from the movable valve plate, and the supporting plate penetrate a through hole, the through hole communicates with the third channel;

the flow-through rod is axially disposed in the connecting piece, the flow-through rod axially contacts the supporting plate and the valve plate, so as to locate the flow-through rod, and the valve plate performs reciprocating elastic actuation in the axial direction of the flow-through rod, the third channel is located on the lateral face of the flow-through rod, the flow-through rod axially penetrates a fourth channel, the fourth channel communicates with the division tube;

the blocking piece and the detent structure are disposed in the valve shell respectively, the flow-through rod and the third channel are axially opposite to the blocking piece respectively, the detent structure is connected to the blocking piece, so as to stop the axial reciprocating actuation of the blocking piece, and to change the connected relation between the third channel and the fourth channel.

2. The valve core with a flow-through rod defined in claim 1, wherein said detent structure is an electromagnetic control structure, so as to automatically control the actuation of said blocking piece.

3. The valve core with a flow-through rod defined in claim 1, wherein said connecting piece is provided with a ring surface, said ring surface is located in the second chamber, said valve plate abuts on said ring surface, so as to locate the valve plate.

4. The valve core with a flow-through rod defined in claim 1, wherein one end of the flow-through rod far from the valve plate forms an end face, so that said blocking piece abuts on the end face, so as to block off the connected relation between the third channel and the fourth channel.

* * * * *